Wilson & Hughes.
Turning Bungs.
No. 68,020. Patented Aug. 20, 1867.
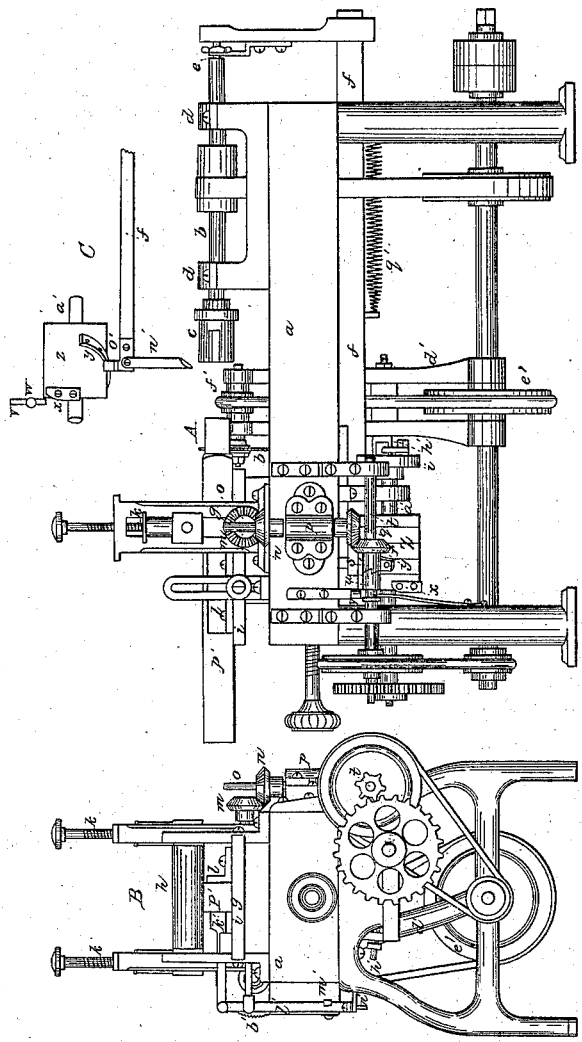
Witnesses:
Inventors:

United States Patent Office.

JOHN WILSON AND RICHARD HUGHES, OF BOSTON, MASSACHUSETTS.

*Letters Patent No. 68,020, dated August 20, 1867.*

IMPROVEMENT IN WOOD-TURNING LATHES.

The Schedule referred to in these Letters Patent and making part of the same.

TO ALL WHOM IT MAY CONCERN:

Be it known that we, JOHN WILSON and RICHARD HUGHES, both of Boston, in the county of Suffolk, and State of Massachusetts, have invented an Improved Wood-Lathe; and we do hereby declare that the following, taken in connection with the drawings which accompany and form part of this specification, is a description of our invention sufficient to enable those skilled in the art to practise it.

This invention relates to the construction or arrangement of mechanism in that class of wood-turning lathes employed in the manufacture of pill-boxes, match-boxes, bungs, and other similar tubular and cylindrical articles; and the primary object of the invention is to render conjointly automatic the operations of feeding the stock, holding it stationary for the action of the cutters, bringing the cutters up into action upon it, and carrying them away therefrom, and sawing off the turned article, the stock being secured in the machine so that after the machine is started the formed boxes or other articles are delivered in succession therefrom without any manipulations of an attendant.

Our improvements, however, are not necessarily wholly confined to machines in which all of these results are automatically attained, as the stock may be automatically fed forward the proper distance for the movement of the cutters to form the box, and then automatically stopped, and then again fed forward and again stopped, (automatically,) while the movement of the cutters or of the severing saw may either, or both, be produced by change or shifting of mechanism by hand, or the movements of the cutter or saw, or both, may be made automatic, but the intermittent movements of the stock be effected by shifting of mechanism by hand; but our invention is chiefly designed to render automatic the whole operation of reducing the stock to boxes or other similar articles.

The drawings represent a machine embodying our invention—

A showing a side elevation, B an end elevation, C a fragmentary sketch to be hereafter referred to.

$a$ denotes the bed or frame supporting a rotary cutter-shaft or mandrel, $b$, on which is fixed a cutter-head, $c$, carrying cutters to turn both the inside and outside surfaces of a box or box-covers, or simply a cutter or cutters, to turn an outer cylindrical surface, like that of a bung, for instance. Such cutter or cutters, *per se*, form no part of this invention, and need not differ from such as are now in use for analogous purposes. The shaft $b$ rotates in boxes $d\ d$, and is made capable of endwise movement, its outer end running in a fork, $e$, projecting from a slide, $f$, motion of which slide in either direction carries with it the shaft and its cutters. At the opposite end of the bed $a$ are mounted feed and presser-rolls $g\ h$, between which, and over the surface of a table, $i$, the stock enters the machine, the feed-roll projecting sufficiently through the surface of the table to bite upon the stock. The journals of the feed-roll $g$ turn in suitable bearings in the table-frame, and the surface of the table is made adjustable as to height by screws and slots $k$ or any other suitable mechanism. The table has a gauge, $l$, by means of which, in connection with the adjustment of the table, the stock is centred with reference to the cutters. At one end of the feed-roll shaft is a bevel-gear, $m$, meshing into a similar gear, $n$, on or near the upper end of a vertical shaft, $o$, turning in bearings $p$, and carrying another bevel-gear, $q$, into which meshes a gear, $r$, on the end of a sleeve, $s$, turning freely on a shaft, $t$. This shaft is driven from the driving-shaft $u$, through any suitable connection; and on the shaft $t$, and turning with it, is a sliding-clutch, $w$, pressed up towards, and at proper times clutching with, the sleeve $s$, causing the rotation of the sleeve and its gear, whereby, through said gear and its connections, rotation is imparted to the feed-roll. Connecting with the clutch is a clutch-lever, $v$, swinging on a bearing, $w$, and projecting back, as seen at C, (C showing a reverse plan of the clutch-lever, and a cam, $x$, which actuates the lever, and also another cam, $y$, which communicates end movement to the cutter-shaft.) The cam $x$ is on a cam-cylinder, $z$, fixed on a rotary shaft, $a'$, deriving motion from the driving-shaft through a suitable geared or belted connection therewith. $b'$ denotes the cutting-off saw fixed to a rotary arbor, $c'$, hung in bearings in a swing-frame, $d'$, swinging on the driving-shaft. A pulley, $e'$, on the driving-shaft, communicates motion to a pulley, $f'$, on the arbor-shaft (to drive the saw) through a band, $g'$. On one side of the swing-frame is jointed a link, $h'$, connected to a crank-wheel, $i'$, on the cam-shaft $a'$, and at each rotation of the cam-shaft and cylinder the crank draws the saw over across the stock and severs a piece from the end thereof, the link being made adjustable in length, so that the saw may move a greater or less distance, according to the thickness of the stock being operated upon. Opposite to the gauge $l$ is a presser-block, $k'$, jointed to a lever, $l'$, and held normally up towards or against the stock by the stress of a spring, $m'$. The lower end of the lever $l'$ is connected by a link, $n'$, to the rear end of the slide $f$, by which the cutter-shaft is moved lengthwise, this slide extending along under the bed-piece and sliding in suitable guides, and at its inner end having a capability of slight lateral or swinging movement towards and away from the cam-cylinder. From the inner end of the bar a finger or projection, $o'$, extends towards the cam-cylinder, as seen at C; and when the stock is pressed between the gauge $l$ and the block $k'$ the lever $l'$ presses this finger up into the path of the cam $y$.

The operation of the mechanism is as follows: The front end of a piece of stock, $p'$, (cut to square or rectangular shape in cross-section,) is entered between the feed and presser-rolls, and the surface of the table, the height of the presser-roll, and the position of the gauge are all adjusted to centre the stock with reference to the cutters and in accordance with the thickness of the stock. Motion being then communicated from the driving-shaft, and supposing the stock to have been fed in by the feed-rolls until its front end comes into position for the operation of the cutters, and the clutch to have been thrown back, when the point of the cam $y$ strikes the finger $o'$, the cam, in its rotation, will force the finger towards the adjacent end of the machine, carrying with it the slide $f$, and through it the cutter-shaft and cutter, feeding the cutter up against the stock and into the same to the depth required to be cut, the stock being held stationary while the cutters operate. The movement of the slide has a tendency to press out the link $n'$, turning the lever $l'$, and causing the presser-block $k'$ to clamp the stock tightly against the gauge while the cutter is operating upon it. As the cam in its rotation leaves the finger $o'$, a spring, $q'$, draws back the slide and cutter-shaft, and when the cutters have operated or are drawing back, the rotation of the crank-wheel on the cam-shaft swings over the saw and severs the box or other article just turned by the cutters. Then the cam-cylinder, in its further rotation, brings the clutch-cam $x$ against the clutch-lever $v$, and carries the clutch $u$ up into connection with the gear-sleeve $s$, causing the gear to rotate with the clutch-shaft, and through the gears on the vertical shaft effecting the forward feed of the stock towards the cutter the proper distance for another operation of the cutters, the clutch being thrown back by its spring, when the feed-cam releases it, and the feed of the stock thereby ceasing. The cutters then again move against and into the stock by the action of the cam $y$. The saw then again moves up by the action of the crank $i'$, and severs the box or other article turned. The saw and cutter are then again returned to their normal positions; the stock is again fed by the action of the cam $x$, these operations automatically continuing so long as the stock lasts, being only limited by the length of such stock.

For cutting bungs and similar cylindric articles the table and feed-rolls may be arranged in front of the cutters, in a position at right angles to that shown, so that the stock shall be cut across instead of in line with the grain, in which case the saw will also be arranged to swing in direction at right angles to that shown, or so as to have the same relative arrangement to the line of feed as shown in the drawings.

As the rear end of the stock, in being fed up towards the cutters, passes the presser-block $k'$, said block is carried in by the spring $m'$ and the link $n'$ is drawn out, carrying the finger $o'$ out of the path of the cam, and thus preventing the cutters from being brought up into action with a piece of a stock imperfectly held or clamped.

We claim, in a wood-turning lathe, feeding the stock automatically and intermittently forward into position for the action of the cutter or cutters, and holding the same stationary during the cutting operation by mechanism, substantially as set forth.

We also claim, in combination with automatic intermittent feed mechanism, substantially as described, mechanism, substantially as described, for automatically bringing up the cutters into operation upon the stock, and for carrying them back after each operation.

Also the feed mechanism, cutting mechanism, and sawing-off mechanism, when arranged substantially as set forth, to operate automatically and in succession.

JOHN WILSON,
RICHARD HUGHES.

Witnesses:
J. B. CROSBY,
FRANCIS GOULD.